US011059499B2

(12) United States Patent
Cesaretti et al.

(10) Patent No.: US 11,059,499 B2
(45) Date of Patent: Jul. 13, 2021

(54) SUSPENSION SYSTEM FOR LEVITATION VEHICLES

(71) Applicant: ALES TECH SRL, Pisa (IT)

(72) Inventors: Luca Cesaretti, Pisa (IT); Lorenzo Andrea Parrotta, Pisa (IT)

(73) Assignee: ALES TECH SRL, Pisa (IT)

( * ) Notice: Subject to any disclaimer, the term of this patent is extended or adjusted under 35 U.S.C. 154(b) by 194 days.

(21) Appl. No.: 16/072,884

(22) PCT Filed: Jan. 23, 2017

(86) PCT No.: PCT/IB2017/050331
§ 371 (c)(1),
(2) Date: Jul. 26, 2018

(87) PCT Pub. No.: WO2017/130091
PCT Pub. Date: Aug. 3, 2017

(65) Prior Publication Data
US 2019/0031208 A1   Jan. 31, 2019

(30) Foreign Application Priority Data

Jan. 27, 2016 (IT) .......................... 102016000008308
Sep. 15, 2016 (IT) .......................... 102016000093060

(51) Int. Cl.
*B61B 13/08* (2006.01)
*B60L 13/06* (2006.01)
*B60V 3/04* (2006.01)

(52) U.S. Cl.
CPC .............. *B61B 13/08* (2013.01); *B60L 13/06* (2013.01); *B60V 3/04* (2013.01); *B60L 2200/26* (2013.01)

(58) Field of Classification Search
CPC ........ B60L 13/06; B60L 13/10; B60L 13/035; B60L 13/04; B60L 53/12; B60L 53/126;
(Continued)

(56) References Cited

U.S. PATENT DOCUMENTS 3,937,148 A * 2/1976 Simpson ............. F16C 32/0472
104/283
6,032,770 A * 3/2000 Alcone .................. F16F 7/1011
188/378

(Continued)

FOREIGN PATENT DOCUMENTS

WO      2016/126495 A1    8/2011

OTHER PUBLICATIONS

Alessandro Frau: "Hyperloop Pisa: <Ecco le nostre sospensioni per Hyperloop>", internet article, Jan. 19, 2016 (Jan. 19, 2016), pp. 1-4, XP055317261, Retrieved from the Internet: URL:http://thenexttech.startupitalia.eu/5777-20160119-hyperloop-sospensioni-pisa.

(Continued)

Primary Examiner — Mark T Le
(74) Attorney, Agent, or Firm — Mark M. Friedman (57) ABSTRACT

The performance of a passive-levitation vehicle is improved for moving over a path. The vehicle has a levitation skid slidable on the path and capable of developing a levitation force to support a compartment at a certain distance from the path. A suspension between the compartment and the skid, comprises a kinematic structure to confer degrees of freedom and relative constraints between the skid and compartment; a passive elastic element connected between the skid and the compartment; and a controlled-dynamic element able to exert a force having controlled dynamics between the skid and compartment; the passive elastic element and controlled-dynamic element mounted in parallel to each other and connected to the skid and compartment. sensor detects the distance between the skid and the path. An electronic circuit, connected to the sensor and to the controlled-dynamics element, carries out a feedback control to adjust this distance.

16 Claims, 7 Drawing Sheets

(58) Field of Classification Search
CPC .......... B60L 53/36; B60L 53/39; B60L 5/005; B60L 5/38; B60V 3/04; B61B 13/08
See application file for complete search history.

(56) References Cited

U.S. PATENT DOCUMENTS

| | | | |
|---|---|---|---|
| 6,382,074 B1* | 5/2002 | Migliori | F15B 15/082 91/395 |
| 2016/0229416 A1* | 8/2016 | Bambrogan | B65G 67/24 |
| 2016/0244076 A1* | 8/2016 | Hyde | B61F 99/00 |

OTHER PUBLICATIONS

Anonymous: Il talento di giovani nel futuristico Hyperloop di lusk, internet article, Jan. 11, 2016 (Jan. 11, 2016), XPO55317427, Retrieved from the Internet: U RL: http: //www. rinnovabili.it/mobilita-giovani-pisani-hyperloop-elon-musk-666.

\* cited by examiner

SUSPENSION SYSTEM FOR LEVITATION VEHICLES

The invention relates to a suspension system for levitation vehicles and to the vehicle comprising the system.

The frontier of mass transport concerns vehicles with levitation systems. The load is transmitted along one or more directions by physically separating the vehicle from a track. Therefore, a meatus (gap) is created separating the vehicle from the track. The load is usually transmitted along a direction orthogonal to the meatus, while the relative motion takes place along the longitudinal direction of the track.

The levitation systems can be distinguished into two categories: active levitation systems and passive levitation systems.

The active levitation systems are characterized by the ability to control the dynamics of the system itself. An example of such technology is the electromagnetic levitation system, commonly called MagLev, in which it is possible to control the levitation force.

The passive levitation systems are instead characterized by passive elements, whose parameters cannot be controlled, or can only be controlled with response times relatively long in relation to the characteristic times of the system dynamics. Examples of such systems are: passive magnetic levitation systems characterized by the use of permanent magnets or levitation systems with air skid, both static and dynamic, in which it is possible to adjust the flow rate of air supply, but with higher characteristic times, caused by the dynamics of the pneumatic circuit.

In essence, active levitation systems can take advantage of the levitation generator as a suspension, by controlling it appropriately. Passive levitation systems instead need an ad hoc suspension system.

The suspension system is one of the most critical parts of the vehicle, mainly for two aspects: the performances of the vehicle and of the levitation system, and the requirements of comfort and safety for a mass transportation system. The maximum speed limit is often influenced by vibrations felt inside the vehicle, so it is essential to reduce them. That's why standards about comfort for transport systems suggest mean-square acceleration values deemed comfortable by humans. The suspensions affect the behavior of the skid and are responsible for the grip on the track.

The main object of the invention is to propose a suspension system for passive levitation vehicles improving this state of the art.

Figure 1:
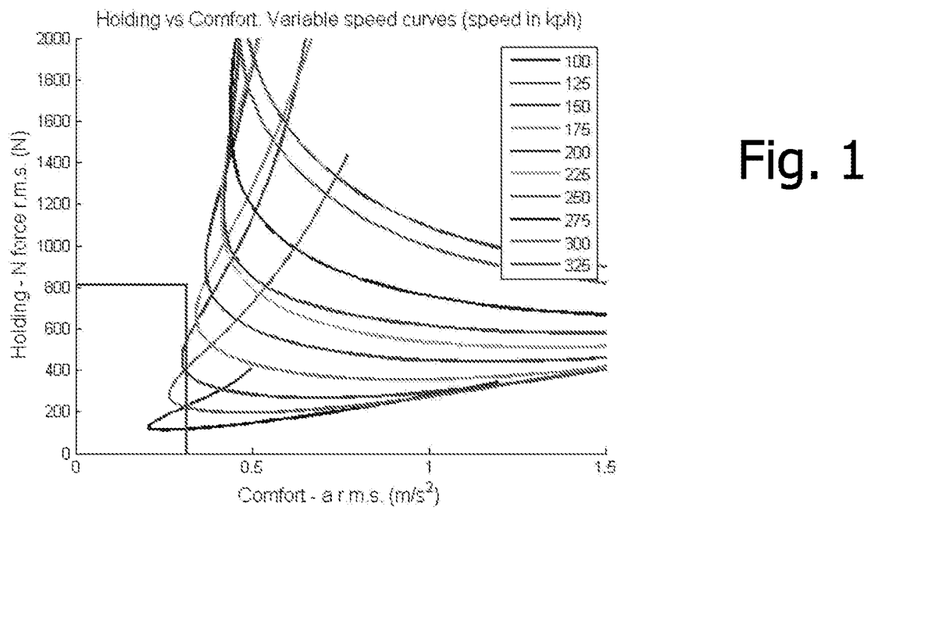
FIG. 1 shows a graph derived from a theoretical study.

The Applicant has conducted a study on known passive suspensions adapted to the case of passive levitation vehicles. The main parameters were the masses, the inertia and the size of the vehicle. The suspensions were schematized through macroscopic parameters: stiffness, damping and inertia. Using the quarter car model, the analysis estimated the parameters that quantify comfort and grip. These parameters are affected by the profile and by the system (composed of skids, vehicle mass and suspensions). The maximum obtainable speed was then calculated so as to meet the standards of passenger comfort and proper operation of the skid, see FIG. 1. It can be deduced that the maximum allowable speed for the vehicle with classic passive suspensions is limited. Considering the estimations of this study, the performance of a common suspension system does not meet the requirements of comfort and grip. The main features of the system and of the skids create vibrations and forces that cannot can be dealt with by a passive system.

Another object of the invention is therefore to produce a suspension system for passive levitation vehicles with better performance.

Another object is to provide a suspension system for passive levitation vehicles which overcomes the limits of the passive suspension.

A first aspect of the invention is a passive levitation vehicle for moving over a path, comprising:
 a passenger compartment,
 a levitation skid slidable on the path and capable of developing a levitation force to support the compartment at a certain distance from the path,
 a suspension, connected between the compartment and the skid, comprising:
  a kinematic structure to confer degrees of freedom and relative constraints between the skid and the compartment;
  a passive elastic element connected between the skid and the compartment;
  a controlled-dynamic element able to exert a force having controlled dynamics between the skid and the compartment;
  the passive elastic element and the controlled-dynamic element being mounted in parallel to each other and connected, e.g. at their ends, respectively to the skid and the compartment;
 a sensor for detecting the distance between the skid and the path,
 an electronic circuit, connected to the sensor and to the controlled-dynamics element, for carrying out a feedback control in order to adjust said distance, the electronic circuit being able to
  read a signal emitted by the sensor, and
  as a function of the signal, drive the controlled-dynamic element to impose a desired course to the distance.

The suspension connects the compartment and the skid, and transmits the loads along one or more directions.

By skid it is generally meant an element which incorporates a levitation system and is configured with one or more surface couplings for mating the levitation system to the path (or support or track). In nominal conditions, the surfaces coupled by the skid exhibit a specific relative position and orientation and allow (a) transmitting loads along one or more directions and (b) the translation along another direction.

By path it is meant in general a course that the vehicle is obliged to follow, for example in a guided manner as a track, or a generic support body.

In the suspension, the passive elastic element may be e.g. a spring.

In the suspension, the kinematic structure allows a perpendicular (usually vertical) movement or translation of the skid with respect to the profile of the path, to compensate tolerances or imperfections of the track and thereby maintaining a correct positioning of the skid.

The damping and filtering of vibrations is the most important function of the suspension system. The main parameter influencing the vibrations is the vertical movement of the skid (orthogonal to the path) due to the profile of the path. In fact, the theoretical study of the passive suspension has highlighted the impossibility to achieve high performance in terms of speed with a common passive suspension system.

According to a preferred variant, the kinematic structure comprises an articulated-parallelogram connection so as to allow a translational movement of the skid with respect to the path (track) by maintaining the skid parallel to the path (track).

The kinematic structure is preferably configured to allow secondary movements of the skid: the pitch and the roll (consider the skid like a vehicle and imagine the common notation of degrees of freedom of a vehicle).

The controlled-dynamic element within the limits of the degrees of freedom imposed by the kinematic structure, allows controlling the dynamics of the skid with respect to the path (track), and thus of the compartment.

In a first variant, the controlled-dynamic element is:
a variable-stiffness spring, and/or
a damper element with controllable damping coefficient.

The damper can be selected from various dissipation mechanisms (deformation of viscoelastic solids, bottlenecks of fluids, sliding with friction, yielding of materials, etc.), like: viscous dampers, viscoelastic dampers, dampers with magnetorheological fluid, dampers with electrorheological fluids, dampers with shape memory alloys, resonant mass dampers, resonant liquid dampers; friction dampers (Friction Dampers, FD), magnetorheological dampers (MagnetoRheological Dampers, MRD).

In the case of an FD, an actuator (electrohydraulic, electromagnetic or piezoelectric) adjusts the normal force applied to the friction plates. In the case of an MRD, an electromagnetic circuit is employed to modulate the intensity of the magnetic field applied to the magnetorheological fluid. A controlled-friction damper potentially has better performance than a conventional viscous damper as to reduction of vibrations. A magnetorheological damper differs from a conventional viscous damper for the magnetorheological oil and the presence of a solenoid immersed in the damper which produces a magnetic field. Therefore, by controlling the solenoid current, a variable damper is created without the use of moving parts such as valves or variable section orifices. The demands in terms of energy are extremely low. For the control, one needs only to power the solenoid. It is important to note that the rheological properties of the magnetorheological fluid are practically independent of temperature and contaminations. Therefore, the MRD are robust and reliable devices, capable of providing performance on a wide range of operating conditions.

In a second variant, which gave the best performance, the controlled element is an electric actuator, e.g. a linear electromagnetic actuator, which provides extremely rapid responses, and allows the recovery of energy through the use of motors as generators. This solves the problem of small response times and high energy consumption of the hydraulic systems.

Finally, when compared with hydraulic actuators, the main advantages of the electromagnetic actuators are the following:
higher efficiency;
better dynamic behavior;
improvement in stability;
accurate force control;
dual operation of the actuator.

Preferably, in the second variant the electric actuator is arranged in parallel to a passive damper. By appropriately designing the passive damping parameter, one can obtain an increase in performance and reliability.

In order to maintain a correct positioning of the skid, the suspension is preferably configured to allow the skid to follow the path (track) with other degrees of freedom too, in particular with a pitch and a roll (considering the skid as a vehicle and introducing the common notation of degrees of freedom of a vehicle). Called longitudinal axis of the skid that axis parallel to the translation direction and passing through the skid, the pitch is an oscillation about an axis orthogonal to the longitudinal axis of the skid, thereby tending to raise or lower the front tip of the skid. The roll is a swing about the longitudinal axis of the skid, tending to raise or lift up one side thereof. In particular, the suspension preferably comprises a controlled-dynamic element to control the skid according to a roll axis and/or a pitch axis.

In a preferred embodiment for a suspension according to the second variant, the kinematic structure comprises:
a rod constrained to the skid and to the vehicle's (or compartment's) chassis by spherical hinges; and/or
a rod constrained to the skid by means of a spherical hinge and constrained to the vehicle's (or passenger compartment's) chassis by a rotoidal hinge.

The composition of the two subsystems at the equilibrium position provides three degrees of freedom to the skid with respect to the vehicle's (or compartment's) chassis, and in particular it allows vertical movement, pitch and roll about the longitudinal axis of the skid passing through the center of the two spherical hinges connected to the skid.

Preferably, the suspension comprises means for filtering and/or attenuating the secondary movements of pitch and roll. In particular, the means comprise passive elements aimed at reducing pitch and roll movements. These means comprise, e.g.:
for the pitch: e.g. only passive elements, or one or more passive dampers;
for the roll: one or more passive dampers.

According to another aspect of the invention, there are one or more controlled elements arranged for moving the skid with respect to the degrees of freedom of pitch and roll, in addition to the vertical one.

Advantageously, the anti-roll means can only intervene in the roll motion and independent from the other two movements. This feature is achieved thanks to the fact that at the equilibrium position the damper is perfectly parallel to the two rods and the hinges recreate perfectly an articulated-parallelogram connection. If the movement is perfectly translatory the damper does not operate, while if it rotates about the axis formed by the two spherical hinges, the damper operates. For this reason the anti-roll damper takes effect only in the roll motion.

Preferably, said anti-roll means comprise two vertical dampers arranged at the end of the skid, in particular, such dampers are symmetrically placed with respect to the length of the skid. Preferably the actuator is placed between the two dampers, at an intermediate point between the two.

Preferably, to the two vertical dampers there are also associated elastic elements, and e.g. this is obtained by means of two spring-damper assemblies.

Advantageously, the suspension comprises anti-pitching means; in particular made like the anti-roll means, to which here we refer back.

Advantageously, the three movements are, in particular, perfectly independent, feature that allows setting the rigidity and the damping coefficient in an independent manner. Note that an advantage of the shown solution is the modularity, which allows adapting the structure of the system to different conformations of the passenger compartment.

Other advantages of the solution are:
high performance: an active control of a controllable element, such as an electromagnetic actuator, improves the performance and increases the maximum accessible speed limit imposed by the comfort and other specifications;

flexibility: the system consists of interchangeable modular sub-assemblies and commercial parts;

reliability: the controllable element is coupled with common passive systems. This ensures a fail-safe design, because in the absence of energy, the system continues to work as a passive system;

energy: electromagnetic actuators differ from hydraulic ones not only for performance and response time, but also for efficiency, since they can recover energy when performing a negative work.

The skid may be of various types. E.g. a levitation skid working through compressed fluid (e.g. air or liquid). The high pressure fluid is channeled towards nozzles present on the lower surface of the skid and interacts with the corresponding surface of the path. Or a fluid-dynamics levitation skid. The fluid (e.g. air) present inside the meatus between the skid and the path transmits the load under dynamic conditions thanks to the relative movement between the skid and the path and to the particular conformation of the meatus. Or a levitation skid working by means of a magnetic field. E.g. a passive magnetic levitation skid obtained by means of one or more permanent magnets, e.g. prepared according to a Hallbach-array configuration placed in the skid that interacts with a track made of conductive material. E.g. a magnetic levitation skid obtained by the use of superconducting magnets. E.g. a levitation skid obtained by means of electromagnets. Or a levitation skid functioning by means of other principles, e.g. rockets, bearing surfaces, ionic thrusters.

According to a preferred variant, the control system is programmed to implement a feedback scheme to maintain constant or approximately constant the separation or gap between the skid and the path (or track).

In another variant the control system is programmed to implement a feedback scheme to maximize a parameter consisting of the weighted sum of two or more variables representing control objectives. These variables can be e.g.:

the constant distance of the separation between the skid and the path (track); and/or the vibration reduction of part or of the entire structure of the compartment; and/or the stabilization of the dynamics of the levitation skid.

For the transport of persons, the vehicle often needs to run always on the same path. Thus, it is advantageous to exploit collected information about the path in order to increase the control performance in real time. For the purpose, a control strategy optimized according to the path information is used. E.g. it is possible to couple to one of the variants of the feedback control method a feed-forward control: the control system is programmed to optimize a target function, e.g. a function that represents the constant conservation of the separation between the skid and the path.

Another variant envisages that the control system is programmed to recalculate and update own parameters in real time as a function of the profile of the known path or track. For the purpose of gathering information about the path or track profile, the vehicle is equipped with a sensor detecting and recording the path, and constantly updating the version thereof in a controller's memory. This way one can take into account the inevitable small deformations of the path in the course of his construction, or due to temperature variations, or to geological origin or to wear.

Alternatively, the information about the path are detected by a vehicle that has previously travelled the path, and the control system is programmed to receive such information and process to control the skid.

Another variant envisages that the control system is programmed to transmit data, coming from a control unit or sensor relative to an upstream skid, to a control unit relative to a downstream skid (with respect to the travelling direction of the vehicle). Said data are used as feed-forward control signal for the control of the downstream skid.

As said, the electronic circuit is preferably programmed to implement a control in real time based on previously collected information or data of the path. To do this, preferably the vehicle comprises:

a sensor to detect and record the data relative to the path, and

Another aspect of the invention concerns the suspension as defined or described herein in all its variants.

Another aspect of the invention is a method for supporting a passive levitation vehicle with respect to a path on which the vehicle moves, the vehicle comprising:

a passenger compartment, a levitation skid slidable on the path and able to develop a levitation force to support the compartment at a certain distance from the path, wherein the method has the step of connecting a suspension between the compartment and the skid, in particular a suspension comprising:

a kinematic structure to confer degrees of freedom and relative constraints between the skid and the compartment;

a passive elastic element connected between the skid and the compartment;

a controlled-dynamic element able to exert a force having controlled dynamics between the skid and the compartment;

the elastic element and the passive controlled-dynamic element being mounted in parallel to each other and connected, e.g. at their ends, respectively to the skid and the compartment.

In the method the suspension enjoys all the variants described or defined herein, and those mentioned in the claims.

Some preferred variants of the method are:

the distance between the skid and the path is detected, and an element or drive able to exert a force between the skid and the passenger's compartment (or a chassis of the vehicle) is controlled electronically, e.g. feedback-controlled, to adjust the distance between the skid and the path; and/or by a sensor, located e.g. on board the vehicle, data relative to the geometry or course of the path are detected, and as a function of said data an element or drive able to exert a force between the skid and the passenger's compartment is electronically controlled, e.g. with the aim of adjusting the distance between the skid and the path.

Further characteristics and advantages of the invention will become apparent from the description of preferred embodiments, illustrated in the accompanying drawing, in which.

In the figures identical numbers indicate identical or similar parts; and to not crowd the figures some references are not repeated. The components are described as being in use.

Figure 2:
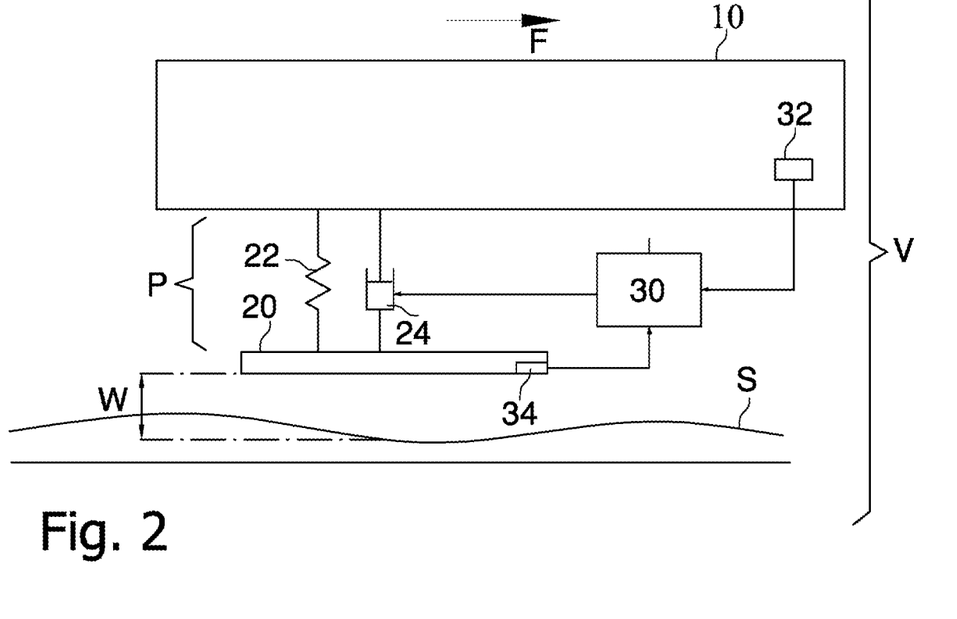
FIG. 2 shows a block diagram of a levitation vehicle.

FIG. 2 shows schematically a vehicle V movable along a direction F with respect to a track S. The vehicle V comprises a passenger compartment 10, a skid 20 for levitation with respect to the track S and a suspension P between the skid 20 and the passenger compartment 10. The skid 20 allows developing a force opposing the weight of the vehicle V to support without mutual contact the passenger compartment 10 over the track S (the skid 20 is at a distance W from the track S, W being also the height of a gap between the skid 20 and the track S).

In a first variant, the suspension P is composed by the parallel of a spring 22 and an active damper 24. The damper 24 is able to vary its damping constant as a function of an external signal coming from an electronic circuit 30, in turn connected to a sensor 34 capable of detecting the distance W.

Preferably, the electronic circuit 30 is a microprocessor or a programmable DSP for implementing an algorithm of digital control.

In general, the circuit 30 implements a feedback control with the sensor 34 for maintaining the distance W around a reference value via the driving of the controllable organs in the suspension P.

The control algorithms may be different. The examples presented below are based on a non-linear quarter car model, in which a passive damper with uncontrolled damping parameter c is replaced by a controlled damper c(t).

The quarter car model is given by the following equations:

$$\begin{cases} M\ddot{z} = -k(z - z_t) - c(\dot{z} - \dot{z}_t) \\ m\ddot{z}_t = -k(z - z_t) - c(\dot{z} - \dot{z}_t) + k_t(z_t - z_r) \end{cases}$$

wherein $z$ and $z_t$ are the coordinate of the body and of the skid; $k$ and $k_t$ are the stiffness coefficients of the suspension and of the skid, respectively; c is the value of the damping coefficient at the instant considered; $z_r$ is a disturbance on the track S.

A control strategy oriented to comfort is, for example. the States Skyhook Control (SH 2-States). This approach is based on the Skyhook phenomenon: a fictitious damper is positioned between the suspended mass and a fixed reference. When only a semi-active damper is used, vibration reduction is obtained through a control logic such as that below. The 2-States algorithm is an on/off (discontinuous) algorithm which switches between two damping values in order to meet the comfort specifications. The logic rule is:

$c = c_{max}$ if $\dot{z} \cdot \dot{z}_{def} \leq 0$ $c = c_{min}$ if $\dot{z} \cdot \dot{z}_{def} > 0$ Essentially, the controller deactivates the controlled damper when the speed of the body, $\dot{z}$, and the opening speed of the suspension, $\dot{z}_{def} = (\dot{z} - \dot{z}_c)$, have opposite signs. Such strategy has the advantage of being simple, but requires two sensors.

Figure 3:
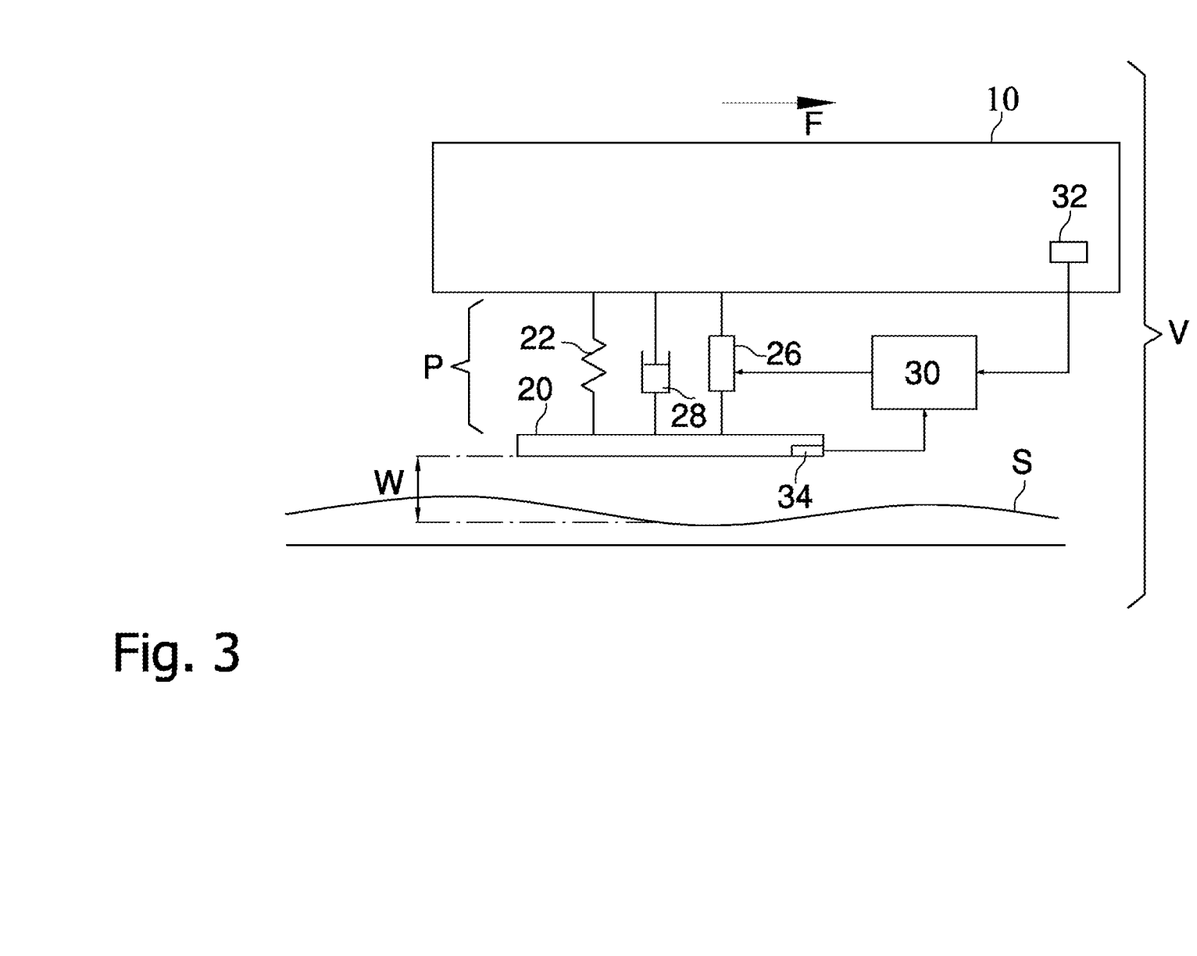
FIG. 3 shows a second diagram of a levitation vehicle.

In a second variant, see FIG. 3, the suspension P is composed of the parallel of: a spring 22, a passive damper 28 and a linear electric actuator 26 capable of applying a force between the skid 20 and the passenger compartment 10 as a function of an input signal coming from the circuit 30. The passive damper 28 is optional, and when it is present it can be controlled by the circuit 30 as the damper 24 or not.

Figure 4:
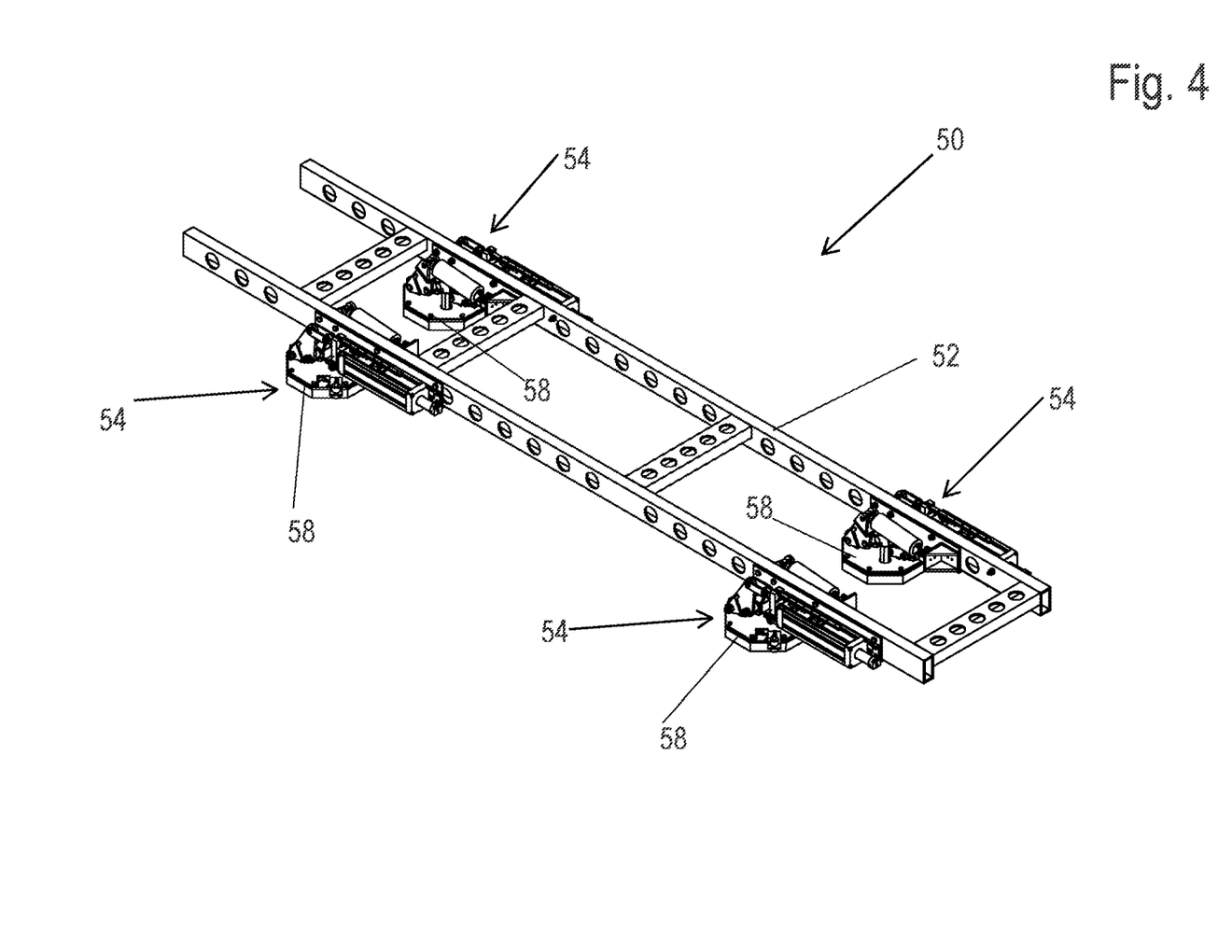
FIG. 4 shows an axonometric view of a first variant of suspension.

FIG. 4 shows an applicative variant of suspension 50 applied to a frame 52 of a vehicle (not shown). The suspension 50 comprises four suspension systems 54, arranged according to the corners of a rectangle, which connect the frame 52 to respective levitation skids 58. The suspension 50 is an electro-mechanical system that mechanically connects a skid 58 to the suspended frame 52. The suspension 50 carries out the suspension P of FIG. 3.

A skid 58 is constituted by a surface having a series of holes (not shown) from which a certain flow of air is delivered. The lower surface of the skid 58 is planar and parallel to the surface of a rail or support S, which is also planar. To ensure safe operation of the skid 58, it is necessary to keep the two surfaces at a certain distance W. The skid 58 supports the weight of the overlying loads along the direction orthogonal to the track or support S while guarantying the motion along the tangential directions.

Figure 5:
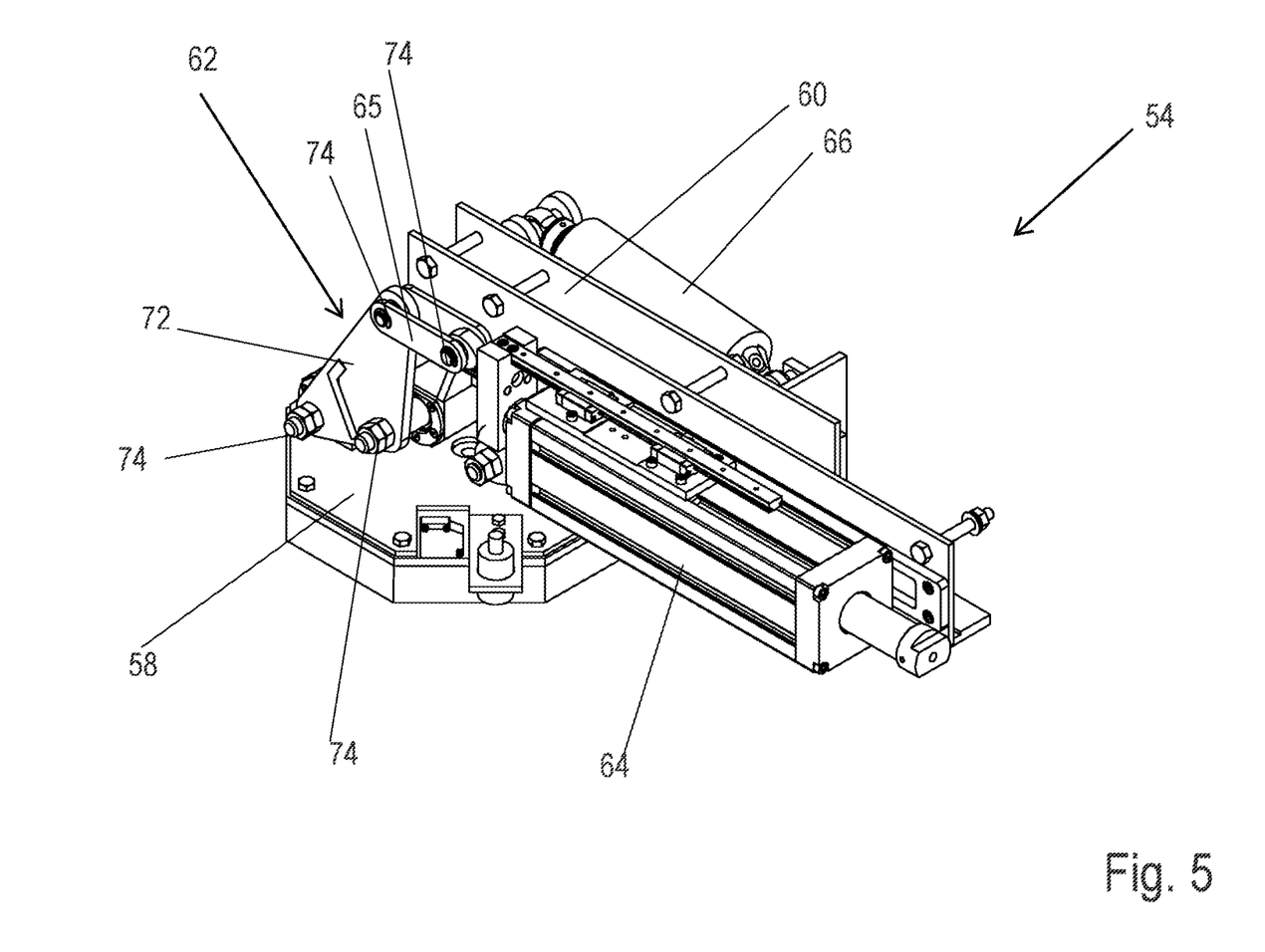
FIG. 5 shows an isometric view of the first variant.
Figure 6:
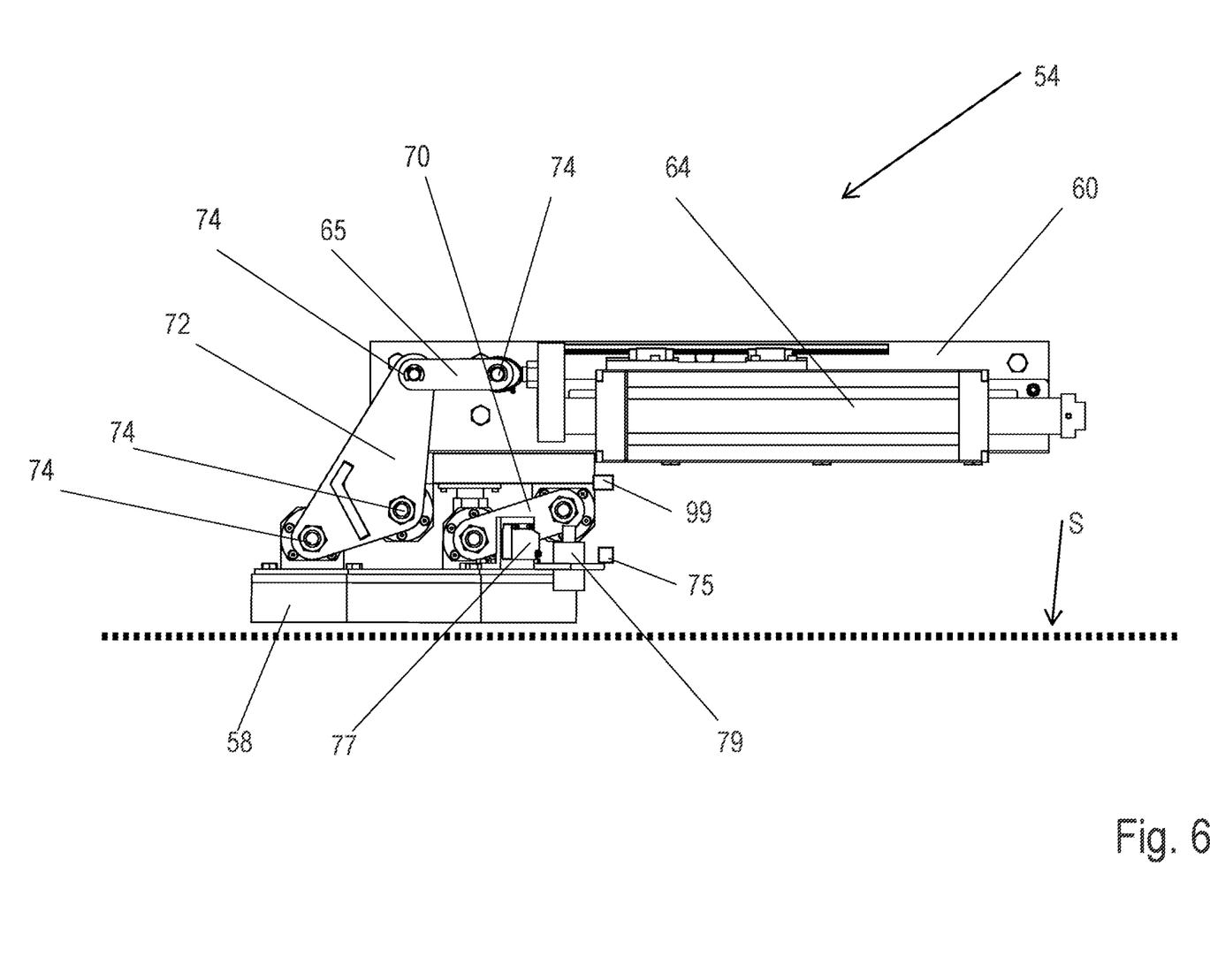
FIG. 6 shows a side view of the first variant.

FIGS. 5 and 6 show in detail a system 54. It comprises a connection flange 60, clampable on the frame 52, which is movably connected to a skid 58 by means of a kinematic chain 62. On the flange 60 there are mounted side by side an electromagnetic actuator 64 and a passive damper 66, which work in parallel to each other synergistically to impart a force between the frame 52 and the skid 58 via the kinematic chain 62. Such chain 62 is an articulated-parallelogram structure formed by an arm 70 and a plate 72, which are bound to each other in correspondence of four pins 74 whose axes are all parallel to each other. Two pins, the lower ones in the figure, are integral with the skid 58; the other two pins, the upper ones in the figure, are integral with the flange 60. The electromagnetic actuator 64 and the passive damper 66 have one end articulated on one side of the plate 72 via an arm 65.

Overall, the kinematic chain 62 determines a translatory degree of freedom between the two surfaces of the skid 58 and of the support S. Specifically, see FIG. 6, the degree of freedom is accomplished perpendicularly to the levitation surface of the skid 58, so as to allow achieving a relative movement between the skid 58 and the frame 52 while keeping the lower surface of the skid 58 constantly parallel to that of the support S.

The skid 58 is equipped with sensors, in particular a distance sensor (e.g. an inductive sensor 79 and/or a laser sensor 77); and/or an accelerometer 75.

The distance sensor measures the distance W between the skid 58 and the surface of the support S. By placing more distance sensors in the skid 58 it is possible to measure the orientation of the skid 58 with respect to the support S. The accelerometer 75 measures the acceleration of the skid 58 and is present when the control system is programmed to stabilize the behavior of the skid 58 and the grip (on support S).

Integrally with the flange 60 or on the frame 52, there is preferably placed (FIG. 6):

an inductive sensor, and/or a laser sensor; and/or an accelerometer, indicated with 99.

The inductive sensor and the laser sensor measure the distance between the frame 52 and the surface of the support or path S. These sensors are used to collect information about the profile of the path S. The accelerometer measures the acceleration or deceleration of the passenger compartment at the suspension 54. It is employed when the control system is programmed to adjust the comfort and the reduction of the vibrations transmitted to the passenger compartment.

In addition to the above-mentioned sensors, a variant comprises a distance sensor to measure the stroke of the suspension 54, e.g. a rotary or linear encoder. In some cases, this sensor is integrated in the controlled-dynamic element 64. This sensor measures the stroke of the suspension 54, defined, in the case of suspension with a single degree of freedom, as the position of the suspension 54 with respect to the degree of freedom of the kinematic structure 62. In the case of suspension with multiple degrees of freedom, in order to reconstruct the position of the suspension with respect to all degrees of freedom there is a plurality of sensors equal to the number of degrees of freedom.

Another variant envisages that on the vehicle's frame there is an inertial measurement device, with the function of measuring relative quantities of the vehicle's dynamics, including e.g. the attitude or height of the vehicle and the roll and pitch angles. Alternatively, such a sensor may be positioned on the skid to measure the dynamics of the same.

The operation principle of the suspension 50 follows the general scheme of FIG. 3. The control unit or circuit 30 receives the signals from the sensors, from which signals it extracts the state of dynamics of the skid 58 and processes an output signal the actuators 64 are driven with.

Figure 7:
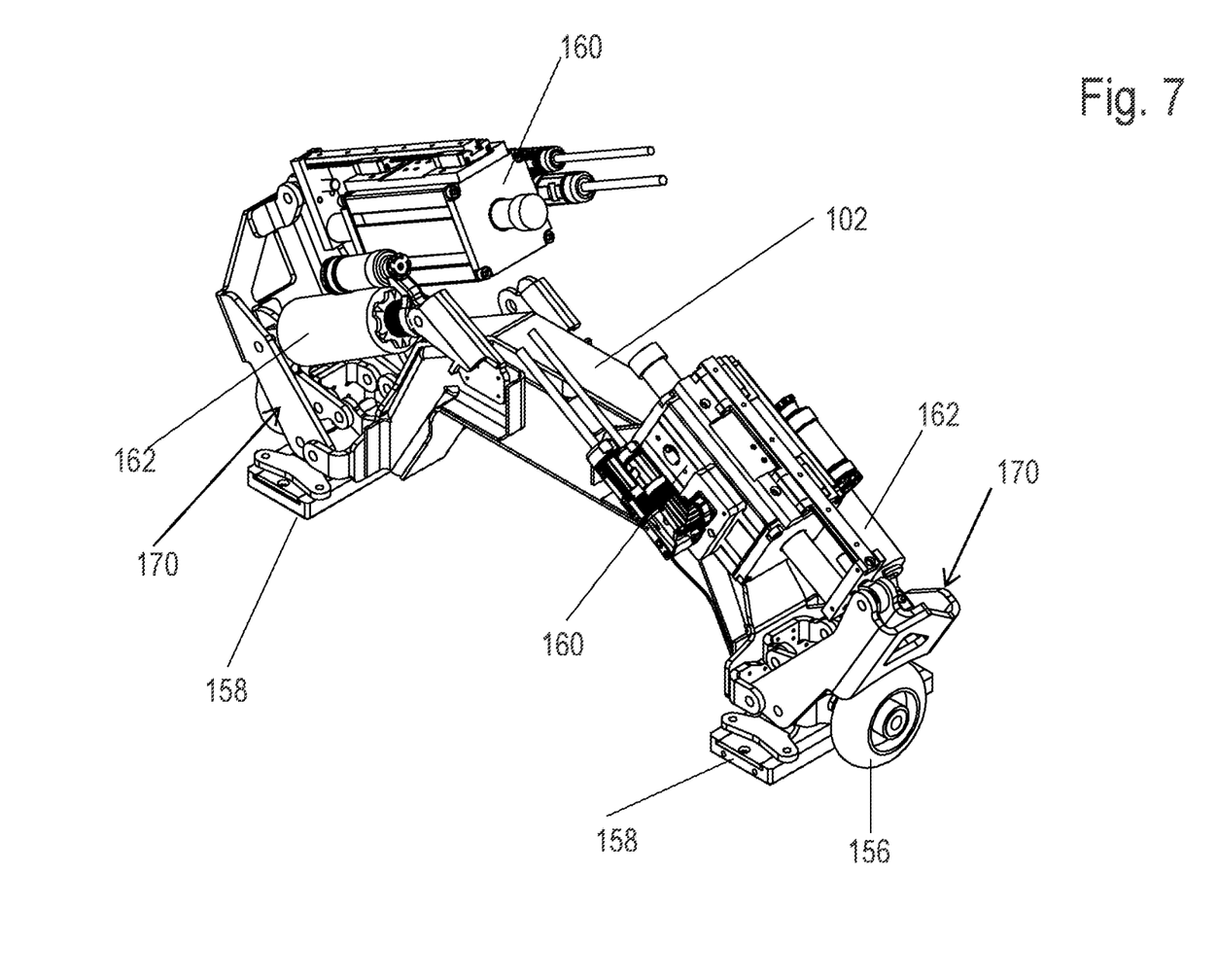
FIG. 7 shows an axonometric view of a second variant of suspension.
Figure 8:
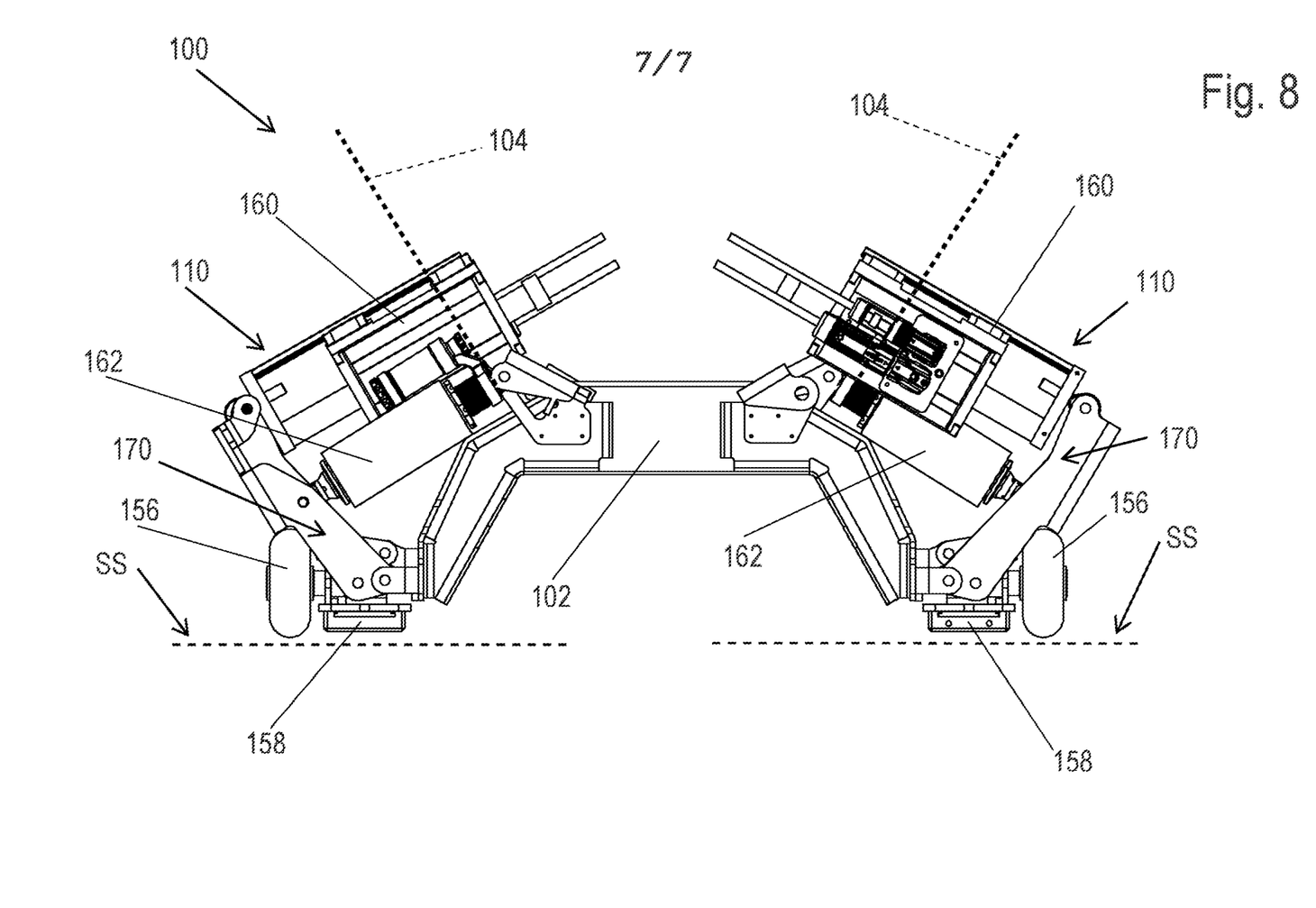
FIG. 8 shows a side view of the second variant.

FIGS. 7 and 8 show a second variant of suspension 100 applied to a frame 102 of a vehicle 104 (shown in dashed lines). The suspension 100 carries out the suspension P of FIG. 3.

The suspension 100 comprises two suspension systems 110 that connect the frame 102 to relative levitation skids 158. In this example, the skids 158 work with passive magnetic levitation, obtained e.g. through the use of a series of permanent magnets arranged according to the configuration called Hallbach-array. The magnets allow generating a levitation force in the event of relative motion with respect to a conductive surface SS which serves as track (analogous to the track S). Considering the support SS consisting of a flat surface of conductive material and arranged parallel to the plane of the skid 158 at a certain distance W, the relative motion tangential to the plane generates eddy currents in the conducting material and consequently a repulsion force perpendicular to the plane, function of the tangential speed between the two surfaces.

The skid 158 comprises a wheel 156, used as a support at low speed.

The two systems 110 comprise electromagnetic actuators 160, passive damping elements 162 and articulated-parallelogram kinematic structures 170.

The kinematic structures 170 operate similarly to those of the first variant. Note the paralleled configuration of the electromagnetic actuator 160 and the passive element 162.

The variant 100 comprises sensors analogous to those described for the variant 50.

A control unit acts as in the previous variant to control the skid 158.

Generally, a suspension according to the invention may allow one or more degrees of freedom between the skid and the frame. In this case there will be a controlled actuator to act respectively on each degree of freedom of the skid, preferably using proximity sensors to measure the distance and the orientation of the skid with respect to the support for sliding.

The invention claimed is:

1. Passive-levitation vehicle for moving over a path, comprising:
a passenger compartment,
a levitation skid slidable on the path and capable of developing a levitation force to support the compartment at a certain distance from the path,
a suspension, connected between the compartment and the skid, comprising:
an articulated kinematic structure configured to confer degrees of freedom and relative constraints between the skid and the compartment;
a passive elastic element connected between the skid and the compartment;
a controlled-dynamic element comprising an electric actuator situated between the skid and the compartment and able to exert a force having controlled dynamics between the skid and the compartment;
the passive elastic element and the controlled-dynamic element being mounted in parallel to each other and connected at their ends, respectively to the skid and the compartment;
at least one sensor including a sensor for detecting the distance between the skid and the path,
an electronic circuit, connected to the sensor and to the controlled-dynamics element, for carrying out a feedback control in order to adjust said distance between the skid and the path, the electronic circuit being able to
read a signal emitted by the sensor, and
as a function of the signal, drive the controlled-dynamic element to impose a desired course to the distance.

2. Vehicle according to claim 1, wherein the kinematic structure comprises an articulated-parallelogram connection able to allow a translational movement to the skid compared to the path causing it to remain parallel to the path.

3. Vehicle according to claim 1, wherein the suspension comprises the controlled-dynamic element to control the skid according to a roll axis and/or a pitch axis.

4. Vehicle according to claim 1, further comprising one or more passive elements configured for filtering and/or attenuating pitch and roll movements.

5. Vehicle according to claim 4, further comprising one or more passive dampers, that are configured for the filtering and/or attenuating of the pitch movements.

6. Vehicle according to claim 4, further comprising one or more passive dampers that are configured for the filtering and/or attenuating of the roll movements.

7. Vehicle according to claim 4, comprising two vertical dampers arranged at the ends of the skid that are configured for the filtering and/or attenuating of the pitch movements.

8. Vehicle according to claim 7, wherein the controlled-dynamic element is arranged between the two dampers, at an intermediate point between the two.

9. Vehicle according to claim 7, wherein elastic elements are associated to the two vertical dampers.

10. Vehicle according to claim 1, wherein the controlled-dynamic element is a variable-stiffness spring and/or a damping element with controllable damping-coefficient.

11. Vehicle according to claim 1, wherein the actuator is a linear electromagnetic actuator.

12. Vehicle according to claim 1, comprising a passive damper placed in parallel with the electric actuator.

13. Vehicle according to claim 1, wherein the electronic circuit is programmed to implement a feedback scheme to maintain constant or approximately constant the separation or gap between the skid and the path.

14. Vehicle according to claim 1, wherein an electronic circuit is programmed to implement a feedback scheme to maximize a parameter comprising a weighted sum of two or more variables that represent
- a constant distance of the separation between the skid and the path; and/or
- a vibration reduction of part or of the entire structure of the compartment; and/or
- a stabilization of a dynamics of the levitation skid.

15. Vehicle according to claim 1, wherein the electronic circuit is programmed to implement a real-time control based on information about the path collected previously.

16. Vehicle according to claim 15, comprising:
- the at least one sensor also including a sensor to detect and record data relative to the circuit, and
- a memory, for storing the detected data about the path,
- the electronic circuit being programmed to read said data from the memory and on the basis of these data perform the control of the controlled-dynamic element.

* * * * *